United States Patent [19]

Faulhaber

[11] 4,333,015

[45] Jun. 1, 1982

[54] SOLID-STATE COMMUTATOR FOR USE IN ELECTRIC MOTORS

[76] Inventor: Fritz Faulhaber, CH-6981 Vernate, Tessin, Switzerland

[21] Appl. No.: 136,967

[22] Filed: Apr. 3, 1980

[30] Foreign Application Priority Data

Apr. 17, 1979 [AT] Austria .................. 2822/79

[51] Int. Cl.³ .............................................. G02B 27/00
[52] U.S. Cl. ..................................... 250/551; 250/229; 310/46; 318/480
[58] Field of Search ................ 250/551, 229; 318/480; 310/46

[56] References Cited

U.S. PATENT DOCUMENTS 3,364,407  1/1968  Hill ....................... 318/480

*Primary Examiner*—David C. Nelms
*Assistant Examiner*—Darwin R. Hostetter
*Attorney, Agent, or Firm*—Michael J. Striker

[57] ABSTRACT

A commutator is manufactured of a printed circuit board having a circular shape. A plurality of terminals are evenly spaced around the periphery of the printed circuit board, and may be connected to junction points in an armature winding. Phototransistors are mounted on the printed circuit board in order to connect selected pairs of terminals to contacts, to which contacts a source of power may be connected. The commutator disclosed herein can be incorporated in an electric motor in which a fixed light source illuminates groups of phototransistors individually, so as to properly direct current flow in the armature winding of the motor. As the commutator rotates, the phototransistors are turned on and off in a sequence, to maintain proper current flow in the armature winding as a function of commutator position with respect to the light source.

11 Claims, 3 Drawing Figures

SOLID-STATE COMMUTATOR FOR USE IN ELECTRIC MOTORS

BACKGROUND OF THE INVENTION

1. Field of the Invention

This invention pertains to a commutator for use in an electric motor which requires no brushes and no commutator bars in order to cause current to flow through the armature windings of the motor in the proper directions. More particularly, this invention pertains to commutators of this type which are designed to energize armature windings which are delta-connected or which are composed of a plurality of coil sections connected end to end in a ring.

2. Description of the Prior Art

Mechanical commutators, i.e. commutators in which brushes or sliprings are utilized in order to change the direction of current flow in the armature windings of an electric motor are known. However, such commutators are composed of many small parts which require substantial expenditures for manufacture and assembly. Such expenditures are particularly great when a small electric motor is to be manufactured. Moreover, it is inconvenient to utilize such mechanical commutators with armature windings which are delta-connected or which include a plurality of coil sections connected together end to end in order to form a ring. Such armature windings are utilized in small electric motors, whether such motors contain a conventional mechanical armature or whether they do not.

It would thus be desirable to provide a commutator which did not require the assembly of a plurality of small parts, which would be suitable for use in small electric motors, and which would further be suitable for use with armature windings that were delta-connected or that included a plurality of coil sections connected together end to end to form a ring. It would also be desirable to provide such a commutator which would be easy to manufacture, highly reliable, and compact.

SUMMARY OF THE INVENTION

These objects, and others which will appear hereinafter, are achieved in this invention by the use of light-actuated semiconductor switches which are mounted on a rotatable planar disc. The disc has a circular periphery, and a plurality of terminals are located adjacent the periphery of the disc and spaced apart from each other at regular intervals. The switches are connected between the terminals so as to connect selected pairs of terminals to two central contacts to which power may be supplied.

When an armature winding is connected to the terminals, and when power is applied to the contacts, no current can flow in the armature until one of the switches has been illuminated. A suitable light source, fixed with respect to the commutator, can then be used in order to illuminate one of the switches and thus to connect the armature winding to power. Then, the armature winding and the commutator begin to rotate as current flows through the armature winding.

The light source is so positioned that it illuminates only one of the switches at any given time. As the commutator rotates, the switch first illuminated passes out of the field of illumination, and thus disconnects the pair of terminals previously connected to power. However, the next switch may then be illuminated by the light source in order to energize another pair of terminals and thus to keep current flowing through the armature winding.

Since this system operates using only solid-state components it is highly reliable and is not subject to mechanical malfunction. Additionally, as will be seen hereinafter, the structure utilized in this invention is such that when it is to be used in a DC motor, it is easy to reverse the direction of motor rotation without reversing the direction of current flow through the motor. Moreover, the motor can also be stopped without changing the current flow to the motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

A commutator, generally indicated by reference numerical 10, utilizes a planar disc 12 with a circular periphery and a center. The disc 12 is mounted upon an axle (not shown) so as to be rotatable about its center in its own plane.

An armature winding contains five like coil sections 20A–20E, which sections are connected together end to end in order to form a ring. Thus, five junction points are formed, with each junction point being located intermediate two adjacent coil sections.

Figure 1:
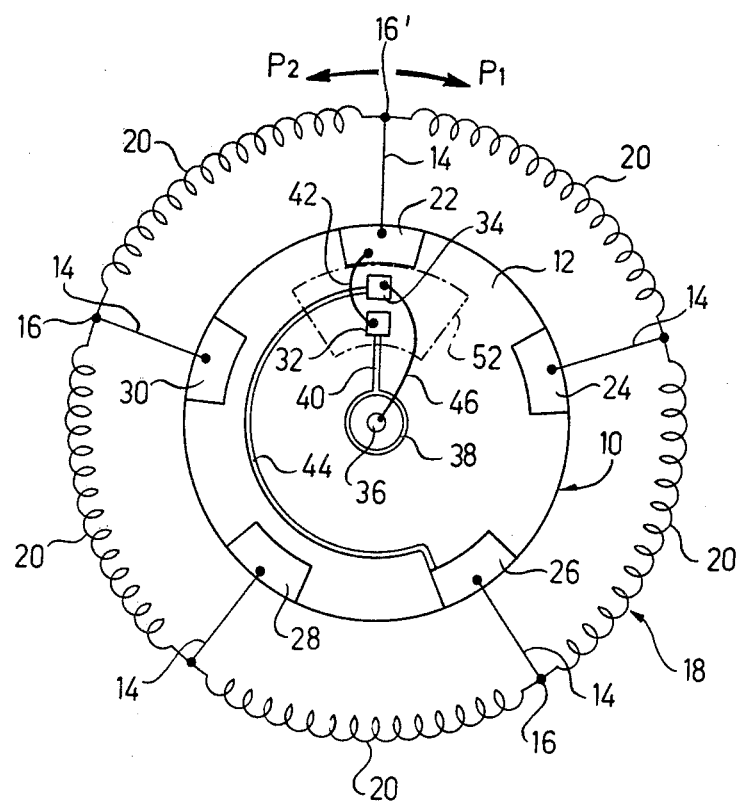
FIG. 1 shows a simplified schematic diagram of a portion of the invention, in which the invention is shown connected to an armature winding.

Five terminals 22, 24, 26, 28, and 30 are located at regular intervals around the periphery of disc 12. Terminal 22 is connected to junction point 22JP by wire 22W, so that terminal 22 is connected to coil sections 20A and 20E. In a similar fashion, terminal 24 is connected to junction point 24JP by wire 24W, so as to be connected to coil sections 20A and 20B. As can be seen in FIG. 1, each of the terminals 22–30 is connected to a radially corresponding one of the junction points 22JP–30JP by wires 22W–30W.

An electrically conductive negative contact 36 is located in the center of disc 12. A jumper wire 46A connects contact 36 to one portion 34A of a light-actuated semiconductor switch hereinafter described. This portion 34A is mounted on a printed circuit section 26PC which is C-shaped and which is connected to terminal 26.

Terminal 22, on the other hand, is connected to another portion 32A of the light-actuated semiconductor switch by jumper wire 42A. Portion 32A is connected to an annular positive contact 38 by connecting strip 40.

Although the construction and operation of the light-actuated semiconductor switch which includes portions 32A and 34A will be described hereinafter, it is only important at this point to note that when portions 32A and 34A are illuminated, current can flow from positive contact 38 to terminal 22 via connecting strip 40, portion 32A of the switch, and jumper wire 42A. In a similar fashion, current can flow from terminal 26 to negative contact 36 via printed circuit strip 26PC, portion 34A, and jumper wire 46A. The armature winding completes the circuit between terminals 22 and 26, with current flowing through two parallel paths. One path (shown as $P_1$ in FIG. 1) includes coil sections 20A and 20B, while the other path (shown as $P_2$ in FIG. 1) includes coil sections 20E, 20D, and 20C.

Since current thus flows through the armature winding, magnetic repulsion between the armature winding and a stator (not shown) causes the entire assembly to rotate about the center of disc 12. The light source (not shown) is so arranged that the portion of the commutator which the light source illuminates is delimited by an arcuate window 52. Inasmuch as there are five terminals 22–30, which terminals are regularly spaced around the periphery of disc 12, the angular width of window 52 is set to equal 72°. In this fashion only one switch can be illuminated at one time.

As the commutator rotates, portions 32A and 34A will move with the commutator until they pass out of window 52, causing current flow between terminals 22 and 26 to cease. However, as will be seen hereinafter, each of the terminals 22–30 is associated with an individual switch, and after the connection between terminals 22 and 26 and power has been broken, another pair of terminals will be connected to power as its corresponding switch enters window 52 and is illuminated by the light source. Thus, current continues to flow in the armature winding, but the individual coil sections through which current flow takes place changes, depending upon the position of the commutator.

Figure 2:
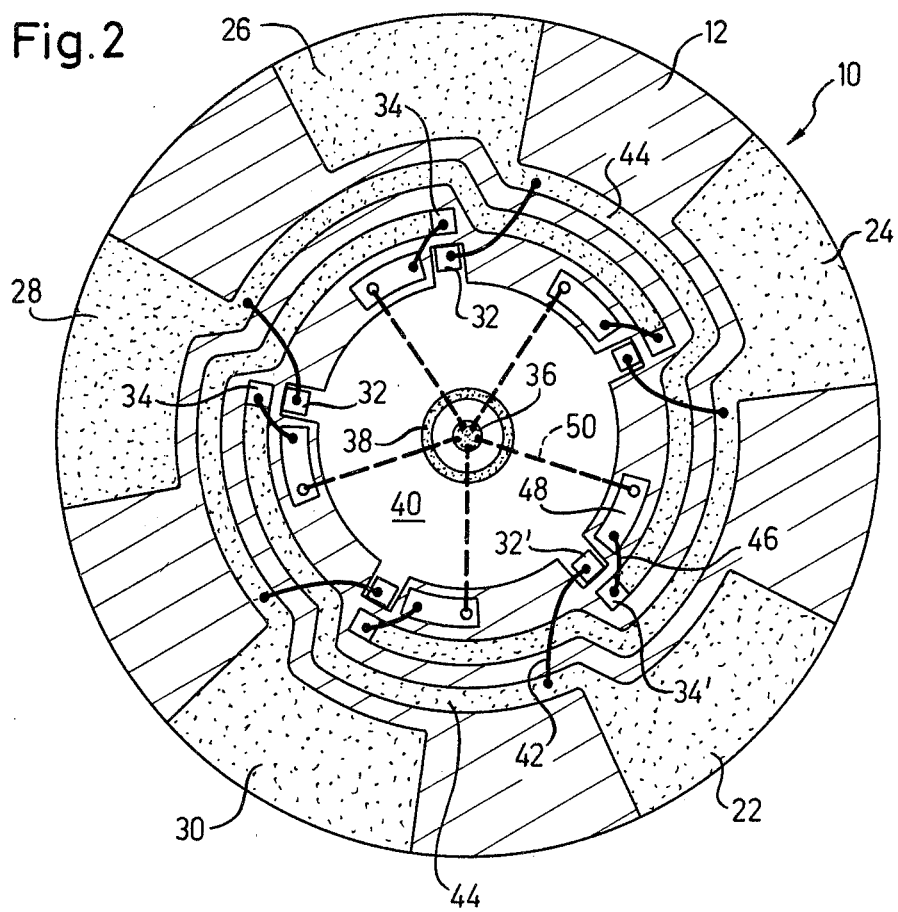
FIG. 2 is a top view of a preferred embodiment of the invention.

Referring now to FIG. 2, the invention is shown isolated from an armature coil, but is shown in its entirety so as to enable the operation of the invention to be more completely understood. Each of the terminals 22–30 is associated with a corresponding printed circuit strip 22PC–30PC which is comparatively narrow, which is elongated, and which extends clockwise on the surface of disc 12 for an angular distance which is slightly less than 180° and is given in greater detail below. All the terminals 22–30 are identical, as are all the printed circuit strips 22PC–30PC. Disc 12 is manufactured of an insulator, so as to prevent current flow between adjacent terminals and adjacent printed circuit strips. Moreover, each of the terminals 22–30 is associated with an individual light-actuated semiconductor switch which is composed of an inner portion 32 and an outer portion 34. Thus, terminal 22 is associated with a first switch which includes portions 32A and 34A, terminal 30 is associated with a second switch including portions 32B and 34B, and so forth.

Each of the radially innermost portions 32A–32E of the five switches is connected to annular positive contact 38 by means of a printed circuit region 40, which is shaped in the form of a circle with five radially outwardly extending tabs upon which portions 32A–32E are placed. Portions 32A–32E are each connected to a corresponding one of the printed circuit strips 22PC–30PC by jumper wires 42A–42E.

Disc 12 is a printed circuit board which is printed on both sides. Five straight strips 50A–50E connect contact 36 with electrically conductive brads 54A–54E. Brads 54A–54E extend entirely through disc 12 so as to conduct current transversely through disc 12 rather than along surfaces thereof. Printed circuit regions 48A–48E are located on the same surface of disc 12 as are the terminals 22–30, and each of the regions 48A–48E is connected to its corresponding brad 54A–54E so as to be connected to contact 36 via a corresponding one of the strips 50A–50E. Each of the regions 48A–48E is connected to a radially outermost portion 34A–34E of one of the switches by means of a corresponding one of the jumper wires 46A–46E. The radially outermost portions 34A–34E of the switches are each mounted on and connected to a corresponding one of the printed circuit strips 22PC–30PC.

It can now be seen that each of the terminals 22–30 is associated with a corresponding light-actuated semiconductor switch which includes a radially innermost portion 32 and a radially outermost portion 34. Each such switch, when illuminated, will cause two terminals to be connected to contacts 36 and 38. The first such switch, which includes portion 32A and 34A, will connect terminals 22 and 26 to contacts 38 and 36 respectively. The second switch, including portions 32B and 34B, will connect terminals 30 and 24 to contacts 38 and 36 respectively. The third such switch, which includes portion 32C and 34C, will effect the same connection between terminals 28 and 22. The fourth switch, including portions 32D and 34D, will likewise effect a similar connection as regards terminals 26 and 30, and the fifth switch, which includes portions 32E and 34E, pertains in a corresponding fashion to terminals 24 and 28.

In use, contact 36 may have power applied to it through an electrically conductive axle (not shown) or may be shaped in the form of an annulus in order to allow power to be applied thereto while the commutator is rotating. As before, a light source (not shown) is fixed with respect to the commutator and is appropriately shrouded so as to illuminate a region encompassing 72° of arc. In this fashion, only one switch will be illuminated at one time and the switches will be illuminated sequentially as the commutator rotates past the fixed light source.

In the embodiment taught herein, current flow in the armature winding is asymmetric since there are an odd number of coil sections. The reason why it is advantageous to utilize an odd number of such sections is that in this fashion the torque developed by a motor in which the invention is installed does not pulsate as much as when an even number of coil sections is utilized. However, there is no technical impediment to constructing this invention utilizing an even number of terminals, if such is desired. In any case, any number of terminals may be utilized as long as they are distributed uniformly around the periphery of the disc.

In the event that an even number of terminals are utilized, the switches should be so arranged that diametrically opposed terminals are connected to power when the switch is illuminated by a light source. However, in the case of an odd number of terminals, such as in the embodiment shown and described herein, it is necessary that the two terminals which are connected to power be as close to diametrically opposed as the structure in question allows.

In the case of an odd number of terminals, those skilled in the art will readily understand that when an odd number of terminals is regularly disposed around the periphery of the disc, a diameter of the disc which passes through the centerline of one such terminal will bisect the angle between two other terminals. Thus, if there are N terminals involved, when N is odd the angular relationship between the terminals which a given switch is to connect to power can be determined by relatively simple geometry. If there are N terminals, the angle included between any adjacent two of them will be 360°/N. Thus, the angle between a disc diameter and either one of the terminals adjacent thereto will be 360°/2N. Thus, when an odd number of terminals is to be utilized, the switches are so connected that when one of the terminals is to be connected to power, the other terminal to be connected to power will be located at an angle of (180°−360°/2N) with respect thereto. This is the angular distance traversed by each printed circuit strip 22PC–30PC.

Figure 3:
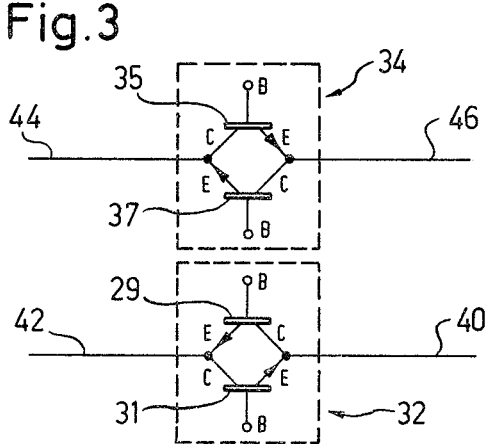
FIG. 3 is a schematic diagram of one of the light-actuated semiconductor switches used in a preferred embodiment of the invention.

It is now appropriate to discuss the light-actuated semiconductor switches which are utilized in this invention. In the event that a unidirectional motor is desired, each of portions 32 and 34 may simply be an appropriately connected phototransistor, which when illuminated will allow current to flow unidirectionally between its collector and its emitter. However, it may be desirable to provide a DC motor which can be easily reversed and stopped without changing the direction of current flowing through the motor. In order to accomplish this objective, each of portions 32 and 34 may be constructed in a fashion such as that shown in FIG. 3 of the drawings. FIG. 3 shows that each of the portions 32 and 34 is composed of a symmetrically connected pair of phototransistors. In each portion 32, two NPN phototransistors 29 and 31 are connected so that the emitter of each one is connected to the collector of the other one. The collector of phototransistor 29 and the emitter of phototransistor 31 are both connected via region 40 to contact 38, while the emitter of phototransistor 29 and the collector of phototransistor 31 are both connected to one of the jumper wires 42. In a similar fashion, portion 34 contains two phototransistors 35 and 37, connected such that the emitter of phototransistor 35 and the collector of phototransistor 37 are both connected to one of the jumper wires 46, while the collector of phototransistor 35 and the emitter of phototransistor 37 are both connected to one of the printed circuit strips which is connected to one of the terminals. In practice, these portions 32 and 34 may be either manufactured separately or together, and they may be made of such a thickness that they approximate the thickness of the printed circuit strip located on disc 12.

When a given light-actuated semiconductor switch composed of portions 32 and 34 is illuminated, the two portions 32 and 34 are bidirectionally conductive, since each pair of phototransistors is connected symmetrically. Thus, for example, current can flow from region 40 to a jumper wire 42 through phototransistor 29 when region 32 is illuminated, and current can also flow from jumper wire 42 to region 40 through phototransistor 31 when region 32 is illuminated. When an embodiment such as that shown in FIG. 3 is utilized, two light sources (not shown) may be appropriately shrouded and fixed with respect to each other along a diameter of disc 12.

When this embodiment is utilized, and when the motor is operated by energizing one of the light sources, the motor can be reversed without changing the direction of polarization of contacts 38 and 36 by merely switching off the light source which is energized and switching the other light source on. This will have the effect of reversing the current flow through the armature winding and thus reversing the direction of the motor. Additionally, in the event that the motor is to be stopped, both light sources may be energized simultaneously, preventing current flow all the way around the armature winding.

It will be noted that in the preferred embodiment, the entire commutator is symmetrical about its center, in order to avoid imbalance during rotation. Since the commutator herein described is essentially a printed circuit board printed on both sides and having phototransistors and jumper wires, the entire assembly is lightweight, easy to assemble using standard printed circuit manufacturing techniques, and extremely reliable as a result of the solid-state construction utilized. Moreover, the number of terminals provided on the disc can be easily varied in order to adapt the invention to any type of armature winding desired, including delta-wound armature windings and rings of coil sections connected together end to end.

It will be understood that each of the elements described above, or two or more together, may also find a useful application in other types of devises differing from the types described above.

While the invention has been illustrated and described as embodied in a solid-state commutator for use in electric motors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A solid-state commutator for use in electric motors, which commutator is designed to energize an armature winding disposed on a rotor by connecting coil sections of the winding across a source, when the winding includes N like individual coil sections connected together end to end at N junction points in order to form a ring, N being an integer greater than two, comprising:
    a planar disc with a circular periphery and a center, the disc being rotatable about its center in its own plane;
    two contacts located symmetrically about the center of the disc, the contacts allowing a source to be connected across the commutator;
    N like terminals located adjacent the periphery of the disc at regular intervals, each of the terminals being connectable to a radially corresponding one of the junction points; and
    N like light-actuated semiconductor switches, each such switch being radially aligned with a corresponding one of the terminals and connecting said corresponding one to one of the contacts and connecting another of the terminals to another one of the contacts when the switch is closed by light impinging upon it, and isolating said terminals from said contacts in the absence of light impinging upon it.

2. The commutator defined by claim 1, wherein N is an odd integer greater than 2.

3. The commutator defined by claim 2, wherein said one of the terminals and said another of the terminals are spaced apart from each other by an angle equal to (180°−360°/2N).

4. The commutator defined by claim 1, wherein N is an even integer greater than 2.

5. The commutator defined by claim 4, wherein said one of the terminals and said another of the terminals are diametrically opposed to each other.

6. The commutator defined by claims 1, 2, 3, 4 or 5, wherein each light-actuated semiconductor switch is unidirectionally conductive.

7. The commutator defined by claims 1, 2, 3, 4 or 5, wherein each light-actuated semiconductor switch is bidirectionally conductive.

8. The commutator defined by claim 6, wherein the disc is a printed circuit board.

9. The commutator defined by claim 7, wherein the disc is a printed circuit board.

10. The commutator defined by claim 6, wherein each light-actuated semiconductor switch contains phototransistors.

11. The commutator defined by claim 7, wherein each light-actuated semiconductor switch contains phototransistors.

* * * * *